(12) United States Patent
Yin et al.

(10) Patent No.: US 10,713,622 B1
(45) Date of Patent: Jul. 14, 2020

(54) COMPUTER-IMPLEMENTED SYSTEMS AND METHODS FOR INTELLIGENT PREDICTION OF OUT OF STOCK ITEMS AND PROACTIVE REORDERING

(71) Applicant: COUPANG CORP., Seoul (KR)

(72) Inventors: Ping Yin, Shanghai (CN); Zonghan Wu, Shanghai (CN); Min Woo Lee, Suwon (KR); Pil Su Kim, Suwon (KR); Yong Zang, Shanghai (CN); Wei Wei, Shanghai (CN); Liwen He, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/705,572

(22) Filed: Dec. 6, 2019

(51) Int. Cl.
| | |
|---|---|
| G06Q 10/08 | (2012.01) |
| G06N 20/00 | (2019.01) |
| G06Q 30/06 | (2012.01) |
| G06Q 10/06 | (2012.01) |
| G06Q 20/20 | (2012.01) |

(52) U.S. Cl.
CPC ......... *G06Q 10/0875* (2013.01); *G06N 20/00* (2019.01); *G06Q 30/0635* (2013.01); *G06Q 10/06* (2013.01); *G06Q 10/087* (2013.01); *G06Q 20/203* (2013.01)

(58) Field of Classification Search
CPC ..... G06Q 10/06; G06Q 10/087; G06Q 20/203
See application file for complete search history.

(56) References Cited

U.S. PATENT DOCUMENTS

| | | | |
|---|---|---|---|
| 2004/0059649 A1* | 3/2004 | Sakuma | G06Q 10/06 705/28 |
| 2004/0128202 A1* | 7/2004 | Baum | G06Q 10/06 705/22 |
| 2005/0172027 A1* | 8/2005 | Castellanos | H04L 41/5003 709/229 |
| 2007/0050235 A1* | 3/2007 | Ouimet | G06Q 10/06375 705/7.31 |
| 2012/0054076 A1* | 3/2012 | Wu | G06Q 10/087 705/28 |

\* cited by examiner

*Primary Examiner* — A. Hunter Wilder
(74) *Attorney, Agent, or Firm* — Finnegan, Henderson, Farabow, Garrett and Dunner, LLP

(57) ABSTRACT

Methods and systems for determining a cause of out of stock condition by running a decision tree against historical information associated with the out of stock item and contacting a supplier of the out of stock item to request items based on the determined cause. The system receives information associated with an out of stock item from a system storing information associated with items in a fulfillment center, the information collected over an extended period, determines a cause of the out of stock condition by running a decision tree against the received information, the decision tree includes a plurality of conditions, and predicts an out of stock condition of the item based on the determined cause. Based on the prediction, the system contacts a supplier of the out of stock item to request more items.

12 Claims, 20 Drawing Sheets

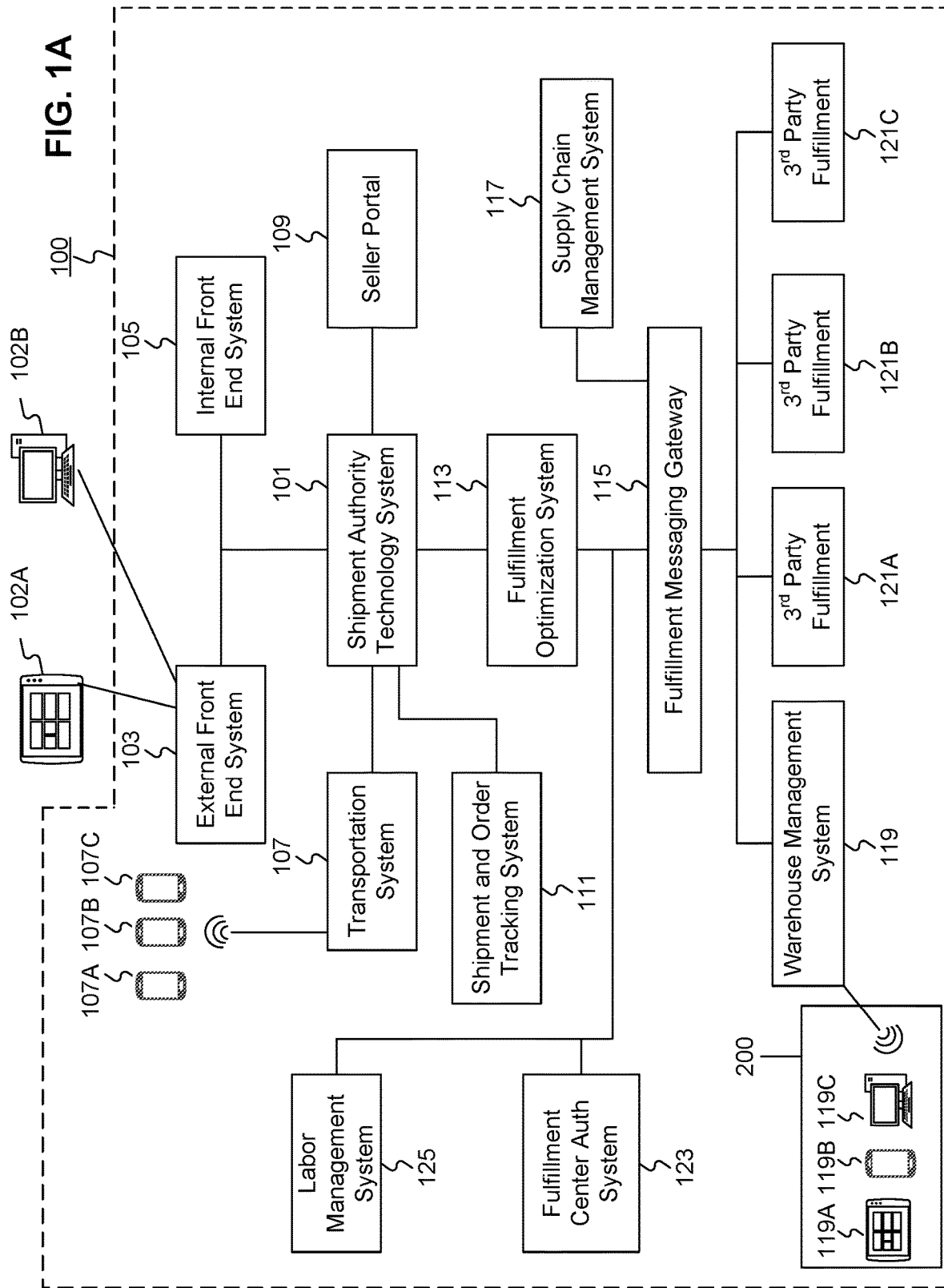

11/28/2018                                Shopping Cart

| General Purchasing (1) | Periodic Delivery (0) |

☑ Select All          Product Information          Item Amount    shipping fee

Rocket shipping products  free shipping

☑    Mozzarella cheese, 1kg, 2 pieces
      Tomorrow (Thursday) 11/29
      Arrival guarantee (order before 12 pm)            [1▼]    free
                                 20,510 won

| Even if you add other rocket shipping products, free shipping available |    shipping Free    Order amount
                                                                                $20.00

☑ Select All (1/1)   [Delete all]   [sold out / discontinued products clear all]    [interest payment]

|                                                                                                $__.00 |

[ Continue shopping ]    [ Buy now ]

Customers who bought this product also purchased

1/5

Rosé spaghetti sauce,      Napoli Chunky Tomato      Grated Parmesan      Bacon and Mushroom Cream
600g, 2 pieces               Pasta Sauce,                   cheese,                  Pasta Sauce,
6,500 won                 3,800 won                   6,460 won             4,870 won
(54 won per 10g)          (86 won per 10g)           (285 won per 10g)      (108 won per 10g)

FIG. 1D

| Day | Low Forecast | Unexecuted Purchase Order | Canceled Purchase Order | Out of Stock |
|---|---|---|---|---|
| D1 | No | No | Yes | No |
| D2 | No | No | No | No |
| D3 | Yes | No | Yes | Yes |
| D4 | No | No | Yes | Yes |
| D5 | No | Yes | Yes | Yes |
| D6 | Yes | Yes | No | No |
| D7 | No | Yes | No | Yes |
| D8 | No | No | Yes | No |
| D9 | No | Yes | Yes | Yes |
| D10 | Yes | Yes | No | Yes |

Add additional columns like sku name to show more information about the out of stock SKU

| SKUSEQ | level_1 | level_2 | NEW_SKU | level1_level11 | level12 | level2_level21 |
|---|---|---|---|---|---|---|
| 10001 | level1 | level11 | | level1_level11 | | |
| 10002 | new_sku | new_sku | new_sku | | | |
| 10003 | level1 | level2 | | level1_level12 | | |
| 10004 | level2 | level21 | | | | level2_level21 |

623:
| SKU_name |
|---|
| name_001 |
| name_002 |
| name_003 |
| name_004 |

FIG. 6D

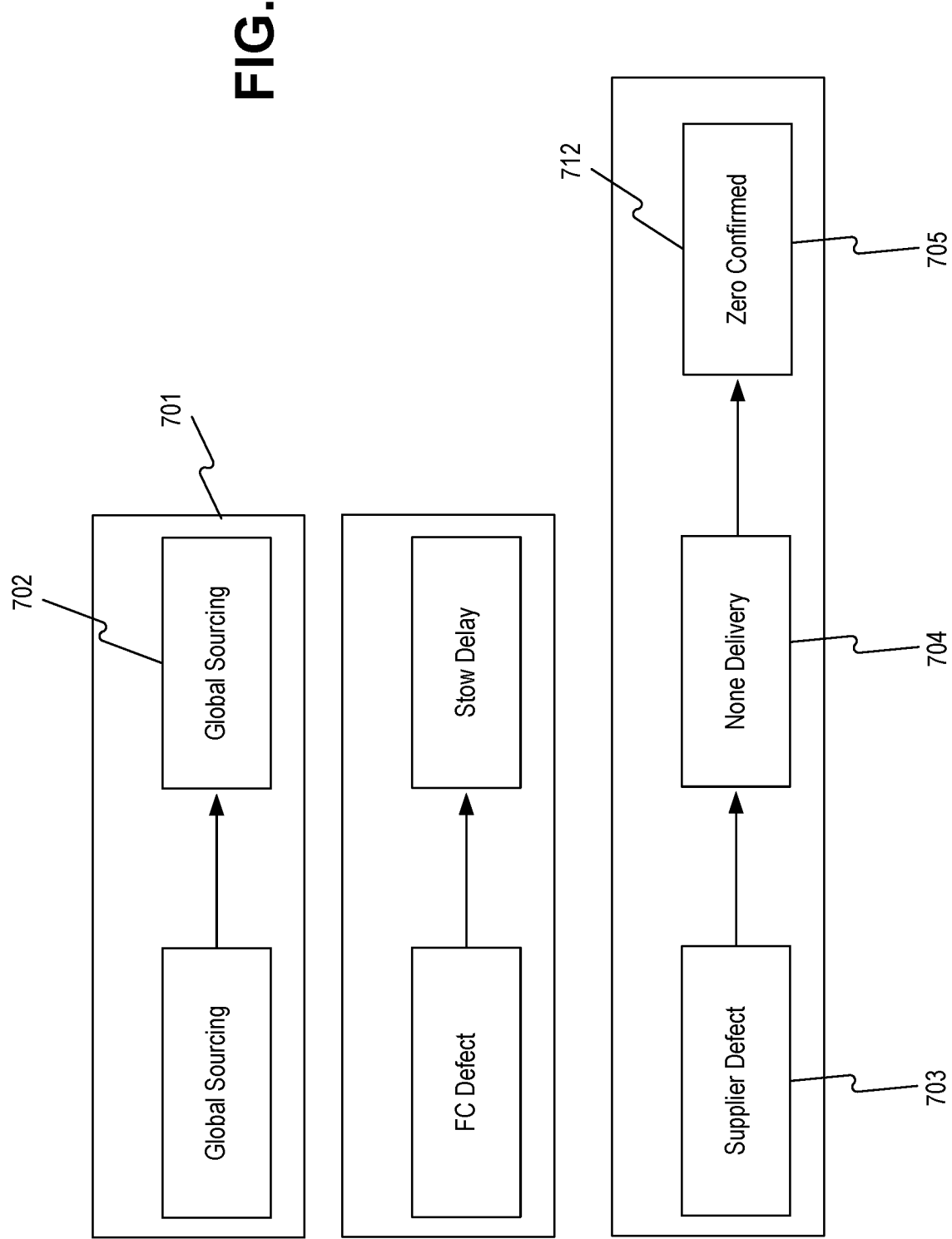

COMPUTER-IMPLEMENTED SYSTEMS AND METHODS FOR INTELLIGENT PREDICTION OF OUT OF STOCK ITEMS AND PROACTIVE REORDERING

TECHNICAL FIELD

The present disclosure generally relates to computerized systems and methods for predicting out of stock items. Embodiments of the present disclosure relate to inventive and unconventional systems for predicting out of stock items by running a decision tree on information associated with items stored in a fulfillment center to determine a cause of the out of stock condition.

BACKGROUND

Fulfillment centers (FCs) encounter more than millions of products daily as they operate to fulfill consumer orders as soon as the orders are placed and enable shipping carriers to pick up shipments. Operations for managing inventory inside FCs may include ordering products and stocking the ordered products so the products can be shipped quickly as soon as the FCs receive the consumer orders. Although currently existing FCs and systems for inventory management in FCs are configured to forecast demands for products, a common issue arises when a FC runs out of stock by purchasing fewer products than an amount of consumer orders because of flawed predictions on product demand. For example, a consumer visits a website associated a merchant associated with an FC to purchase a desired product, but the consumer discovers that the desired product is out of stock. This leads to lost sales and poor customer satisfaction, and a review from the dissatisfied consumer may discourage potential sales from other buyers.

To mitigate such problems, conventional inventory management systems improve a prediction on demands of products by determining out of stock reasons. For example, the systems record one or more occurrences relating to an out of stock condition to determine a reason for the out of stock condition. While these systems attempt to determine out of stock reasons in an efficient manner, the process is manual and inconsistent.

Therefore, there is a need for improved methods and systems for predicting an out of stock item by determining a cause of out of stock condition.

SUMMARY

One aspect of the present disclosure is directed to a system including a memory storing instructions and at least one processor programmed to execute the instructions to perform a method for predicting out of stock items by running a decision tree against historical information associated with the out of stock items and contacting a supplier of the out of stock item to request more items based on the prediction. The method includes receiving information associated with an out of stock item from a system storing information associated with items in a fulfillment center, the information collected over an extended period, determining a cause of the out of stock condition by running a decision tree against the received information, the decision tree includes a plurality of conditions, and predicting an out of stock condition of the item based on the determined cause. The method further includes contacting a supplier of the out of stock item to request more items based on the prediction.

Another aspect of the present disclosure is directed to a method for predicting out of stock items by running a decision tree against historical information associated with the out of stock items and contacting a supplier of the out of stock item to request more items based on the prediction. The method includes receiving information associated with an out of stock item from a system storing information associated with items in a fulfillment center, the information collected over an extended period, determining a cause of the out of stock condition by running a decision tree against the received information, the decision tree includes a plurality of conditions, and predicting an out of stock condition of the item based on the determined cause. The method further includes contacting a supplier of the out of stock item to request more items based on the prediction.

Yet another aspect of the present disclosure is directed to a system including a memory storing instructions and at least one processor programmed to execute the instructions to perform a method for predicting out of stock items by running a decision tree against historical information associated with the out of stock items and contacting a supplier of the out of stock item to request more items based on the prediction. The method includes receiving information associated with an out of stock item from a system storing information associated with items in a fulfillment center, the information collected over an extended period, and a limited number of conditions. Based on the received information and the limited number of conditions, the system determines a cause of the out of stock condition by running a decision tree against the received information, the decision tree includes the limited number of conditions and predicts an out of stock condition of the item based on the determined cause. The system may contact a supplier of the out of stock item to request more items based on the prediction.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1D depicts a sample Cart page that includes items in a virtual shopping cart along with interactive user interface elements, consistent with the disclosed embodiments.

FIG. 4A shows an exemplary table comprising data associated with out of stock condition of item.

FIG. 6A-D show exemplary tables for analyzing a reason for out of stock by running an out of stock root cause calculation algorithm.

FIG. 7 shows an exemplary decision tree hierarchy list.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods, or by performing non-dependent steps in parallel with each other. Accordingly, the following detailed description is not limited to the disclosed embodiments and examples. Instead, the proper scope of the invention is defined by the appended claims.

Embodiments of the present disclosure are directed to computer-implemented systems and methods configured for predicting an out of stock condition of item by running a decision tree. The disclosed embodiments provide innovative technical features that allow proactive ordering of an item in a fulfilment center by predicting an out of stock condition of the item, wherein the prediction is attained by running a decision tree against information related to the item. For example, the disclosed embodiments enable determination of a cause of out of stock condition by running a decision tree against information received from a system storing information associated with items in a fulfillment center, enable prediction on an out of stock condition of the item based on the determined cause, and enable efficient transmission of request to a supplier of the out of stock item to request more items based on the prediction.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
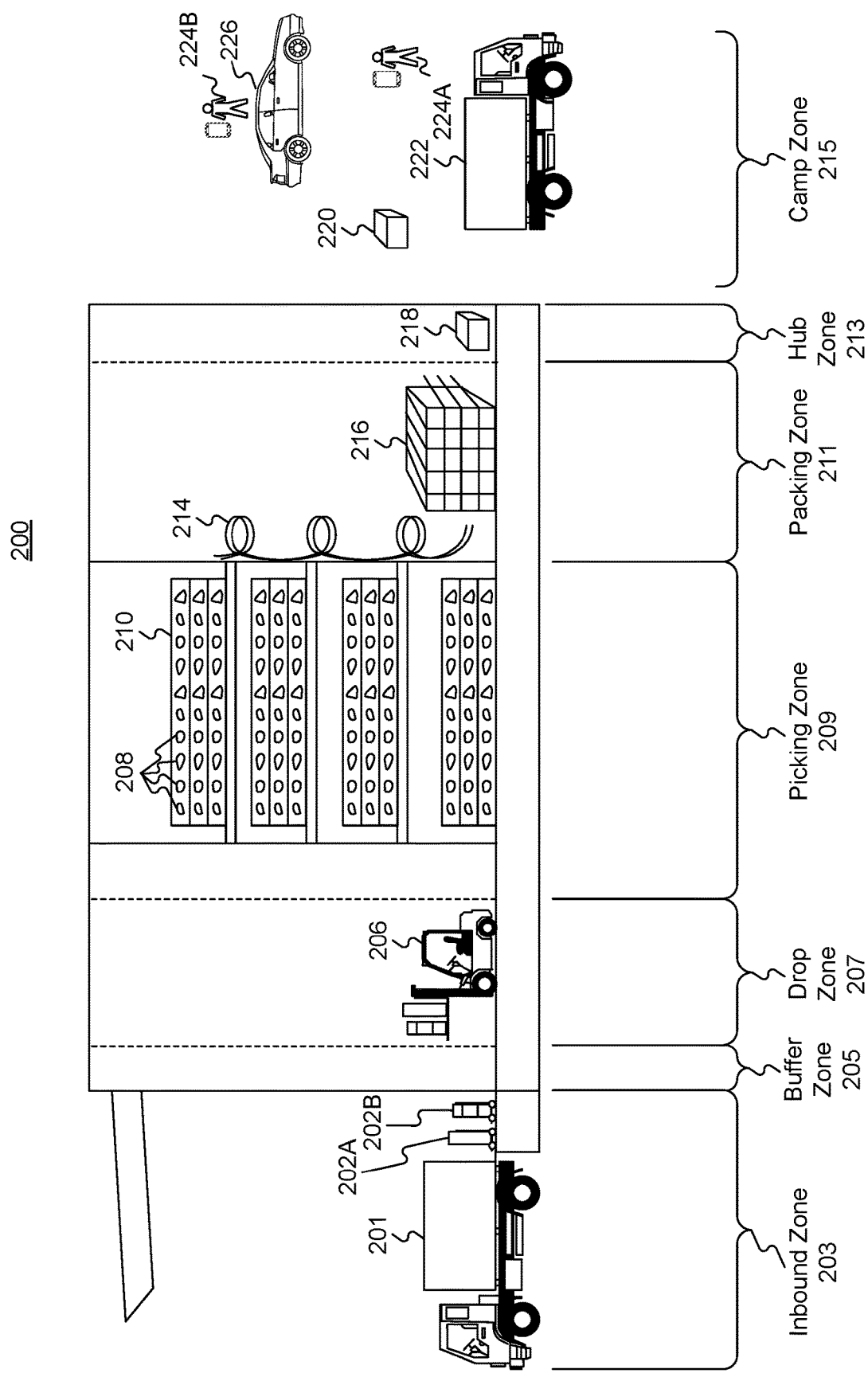
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to an aspect of the present disclosure, a computer-implemented system for predicting an out of stock condition may comprise one or more memory devices storing instructions, and one or more processors configured to execute the instructions to perform operations. The out of stock condition can be predicted or analyzed by running an out of stock (OOS) Root Cause Calculation Algorithm, decision tree construction algorithm, or a decision tree against historical information associated with the out of stock item. In some embodiments, the disclosed functionality and systems may be implemented as part of SCM system 117. The preferred embodiment comprises implementing the disclosed functionality and systems on SCM system 117, but one of ordinary skill will understand that other implementations are possible.

Stock availability can be determined by one or more contributors associated with supply chain ordering and inventory replenishing. For example, contributors may be an error or mistake from commercial decisions, a defect from suppliers, a defect from ordering items, and a defect from fulfillment centers. The contributors may include one or more root causes for out of stock condition. For example, an error or mistake from commercial decisions may include root causes such as obsolete confirming and strategic decision; a defect from suppliers may include none delivery and short delivery; a defect from ordering items may include low recommended order quantity and sales spike; and a defect from fulfillment centers may include a delay in receiving items and a delay in stowing items. The root causes may be arranged in a decision tree by their priorities. The priorities may be determined by a static rule. For example, if a static rule for determining priorities of root causes prioritizes internal issues over external issues, then a root cause associated with a defect from fulfillment centers is prioritized over a root cause associated a defect from suppliers.

Figure 3A:
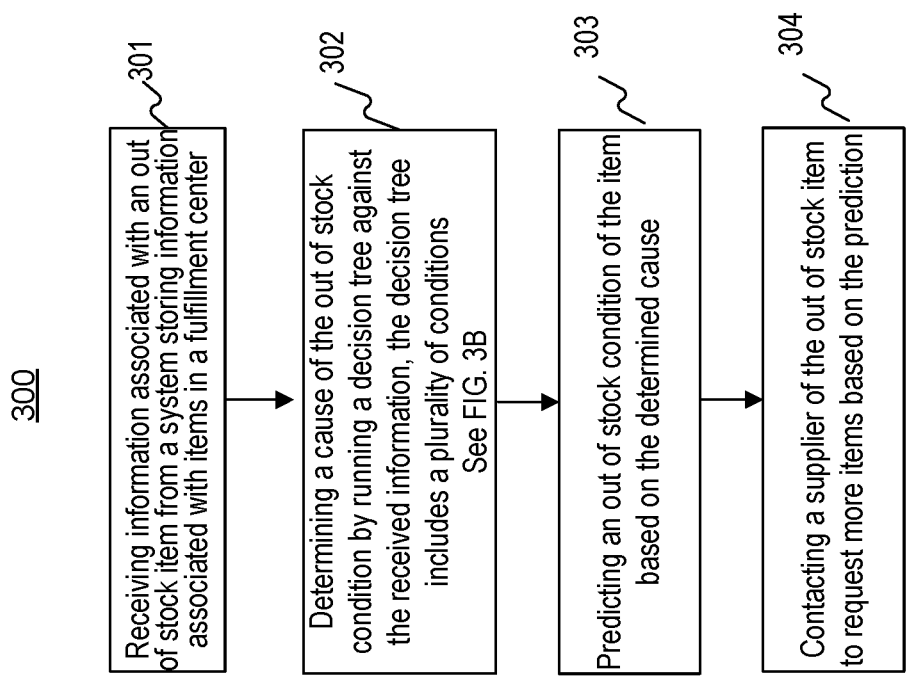
FIG. 3A shows an exemplary method for predicting an out of stock condition of item by running a decision tree on supply chain management system, consistent with the disclosed embodiments.

FIG. 3A shows an exemplary method 300 for predicting an out of stock condition of item by running a decision tree on SCM system 117. The method or a portion thereof may be performed by SCM system 117. For example, the system may include one or more processors and a memory storing instructions that, when executed by the one or more processors, cause the system to perform the steps shown in FIG. 3A.

In step 301, SCM 117 may receive information associated with an out of stock item from FO system 113. As described above with respect to FIG. 1A, FO system 113 may store information related to items stored in fulfillment center 200. The stored information may also include one or more conditions causing an out of stock condition. For example, conditions causing an out of stock condition may include, but are not limited to, a low prediction on forecasting a demand for an item, an unexecuted purchase order for an item, that a purchase order was placed but not yet received by a fulfillment center, a supplier of out of stock item failed to deliver the ordered amount, a defect on an out of stock item, and a cancelation of purchase order associated with an out of stock item. When a quantity of an item stored in fulfillment center reaches zero (Out of Stock), FO system 113 may transmit information associated with the item to SCM system 117 for determining a cause of the out of stock condition. The transmitted information was collected over an extended period. For example, FO system 113 may transmit an exemplary table 400 in FIG. 4A (discussed further below) to SCM system 117. The exemplary table 400 may include information related to one or more conditions causing an out of stock condition and whether an item was out of stock on a given day. The information presented in the exemplary table 400 was collected over ten days. The exemplary table 400 presents only three conditions and data collected over ten days but one of ordinary skill will understand that other configurations are possible.

In step 302, SCM system 117 may determine a cause of the out of stock condition by running a decision tree against the received information, wherein the decision tree includes a plurality of conditions. Step 302 is further described with respect to step 311 in FIG. 3B. In step 311 (FIG. 3B), SCM system 117 may limit a number of conditions. The number of conditions may refer to the length of the longest path from a root to a leaf in a decision tree. For example, as shown in FIG. 4D (discussed further below), decision tree 450 includes three conditions representing the length of the longest path from a root (Low Forecast?) to a leaf (Out of Stock or Not Out of Stock under Unexecuted Purchase Order). Limiting a number of conditions may assist in reducing overfitting of decision tree, wherein the overfitting results from creating over-complex decision trees that do not generalize data well.

Figure 4B:
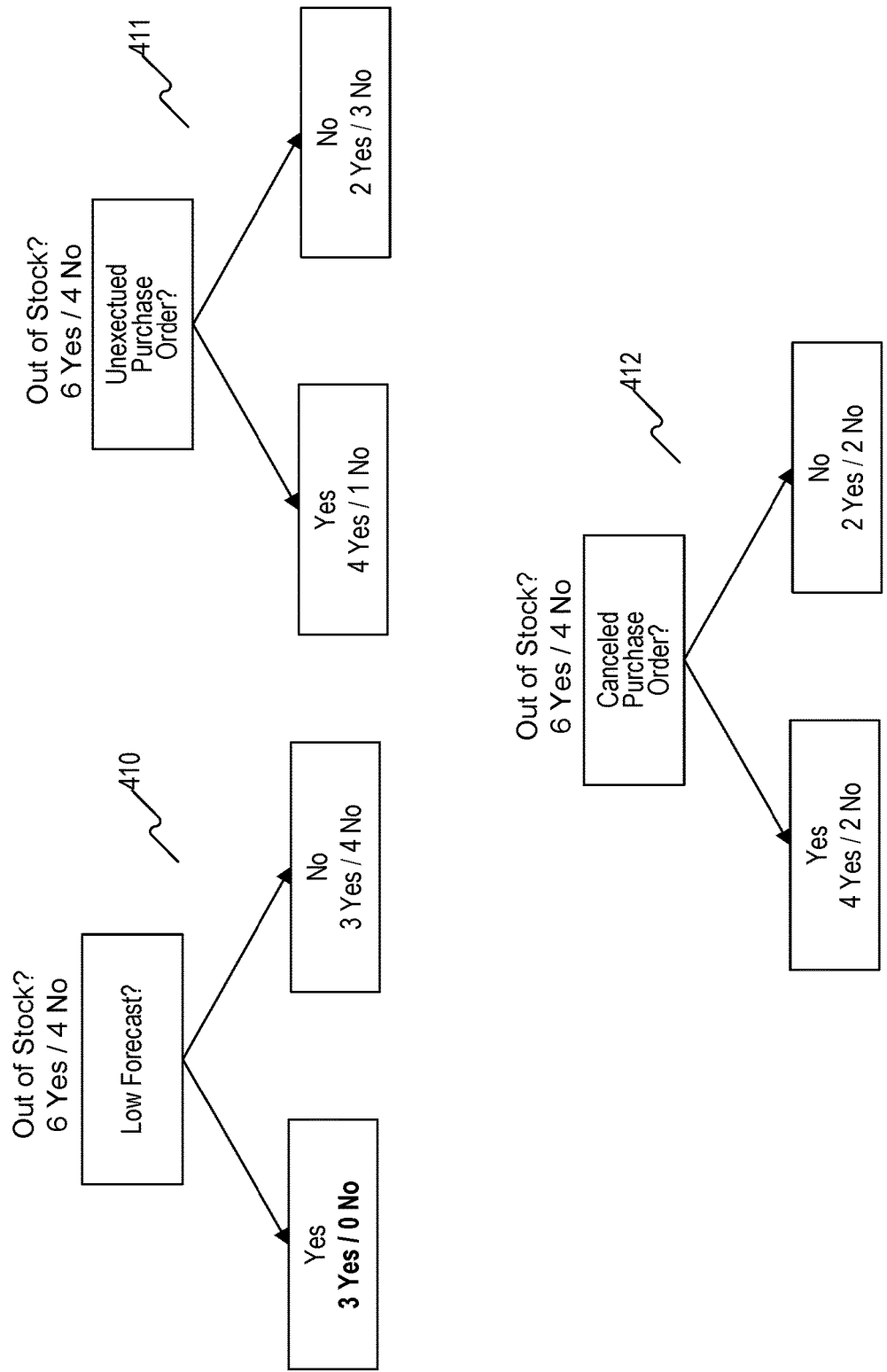
FIGS. 4B and 4C show exemplary methods for measuring a purity for each condition and choosing a condition with the highest purity.

In step 312, SCM system 117 may measure a purity for each condition. The purity may provide a certainty about whether an item goes out of stock or not after a condition splits a decision tree. For example, as shown in FIG. 4A, item was out of stock for six days over past ten days. In FIG. 4B, a purity for each of conditions 410, 411, and 412 is measured. For example, condition 410 has a pure set (3 Yes-Out of Stock on days D3, D7 and D10/0 No-Not Out of Stock) because an item was always out of stock when the item was forecasted low. The pure set provides a complete certainty on an occurrence of out of stock condition. The purity must be symmetric. For example, a condition comprising 4 Out of Stock/0 Not Out of Stock is as "pure" as 0 Out of Stock/4 Not Out of Stock. Unlike condition 410, conditions 411 and 412 do not result a pure set thus in step 313, SCM system 117 may choose condition 410, the condition with the highest purity. The chosen condition (e.g., condition 410) may split a decision tree. SCM 117 may store the chosen condition further splitting the decision tree in a data structure.

Figure 4C:
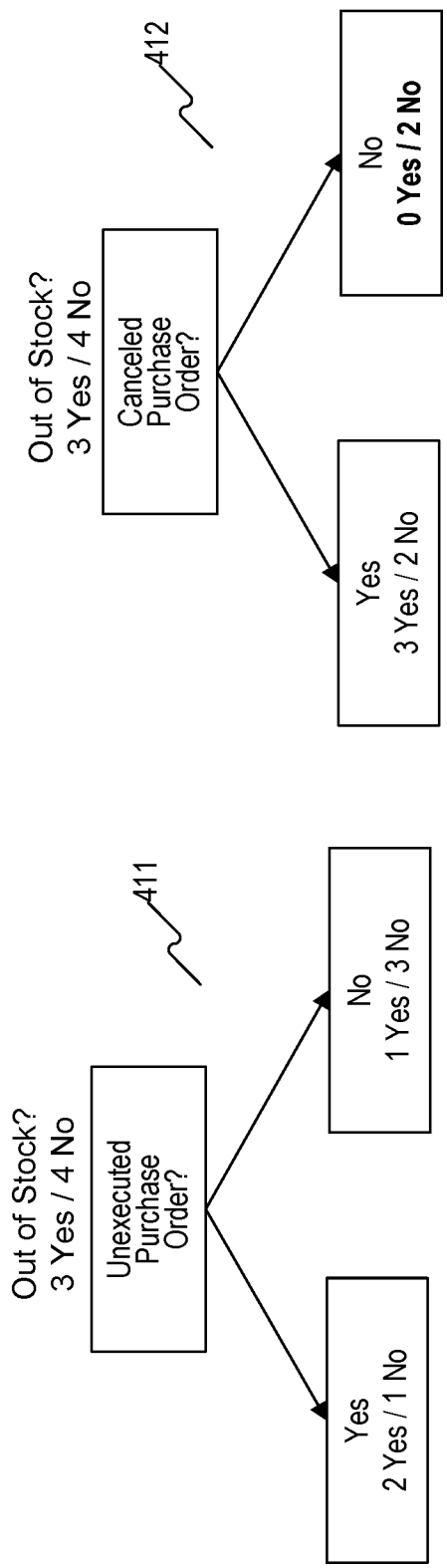

In step 314, SCM system 117 may determine whether all conditions split the decision tree into branches after measuring a purity for each of remaining conditions and choosing a condition with the highest purity. If all conditions do not split the decision trees into branches, SCM system 117, in step 312, may measure a purity for each of remaining conditions. For example, as shown in FIG. 4C, SCM 117 may measure purities for conditions 411 and 412 after choosing highest purity condition 410 in FIG. 4B. By way of further example, as shown in FIG. 4C, an item was out of stock for three days and not out of stock for four days when the item was not forecasted low. Among days when the item was not forecasted low (Days D1, D2, D4, D5, D6, D8, and D9), condition 412 has a pure set (0 Yes-Out of Stock/2 No-Not Out of Stock on days D2 and D6) because the item was always not out of stock when purchase orders associated the item were not canceled. Thus, SCM system 117 may choose condition 412 as a condition splitting the tree after condition 410 and store the condition 412 in the data structure storing the decision tree and chosen conditions splitting the decision tree. As shown in FIG. 4D, condition 412 splits the decision tree 450 branching out of condition 410. Condition 411, as an only remaining condition may split the decision tree after condition 412 in the exemplary decision tree 450 in FIG. 4D.

If all conditions split the decision tree (e.g., decision tree 450 in FIG. 4D) into branches, SCM system 117, in step 315, may determine a cause of out of stock condition by finding a condition forming the longest path from a root of the decision tree. The condition forming the longest path from a root of the decision tree may represent a cause of out of stock condition. For example, as shown in FIG. 4D, condition 411 (purchase orders associated with the out of stock item was unexecuted) forms the longest path from a root (condition 410) of the decision tree 450 and SCM 117 may determine that unexecuted purchase orders associated with the out of stock item is a cause of out of stock condition for the item.

Figure 3B:
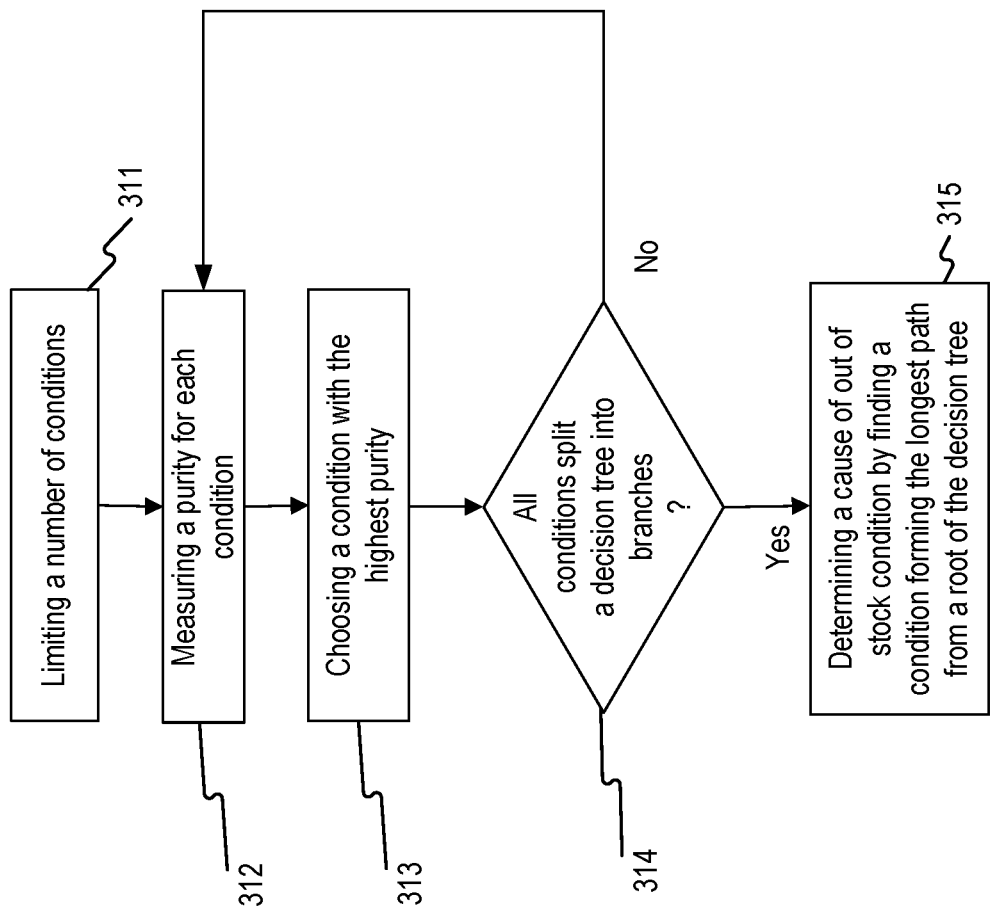
FIG. 3B shows an exemplary method for determining a cause of out of stock condition by running a decision tree, consistent with the disclosed embodiments.
Figure 4D:
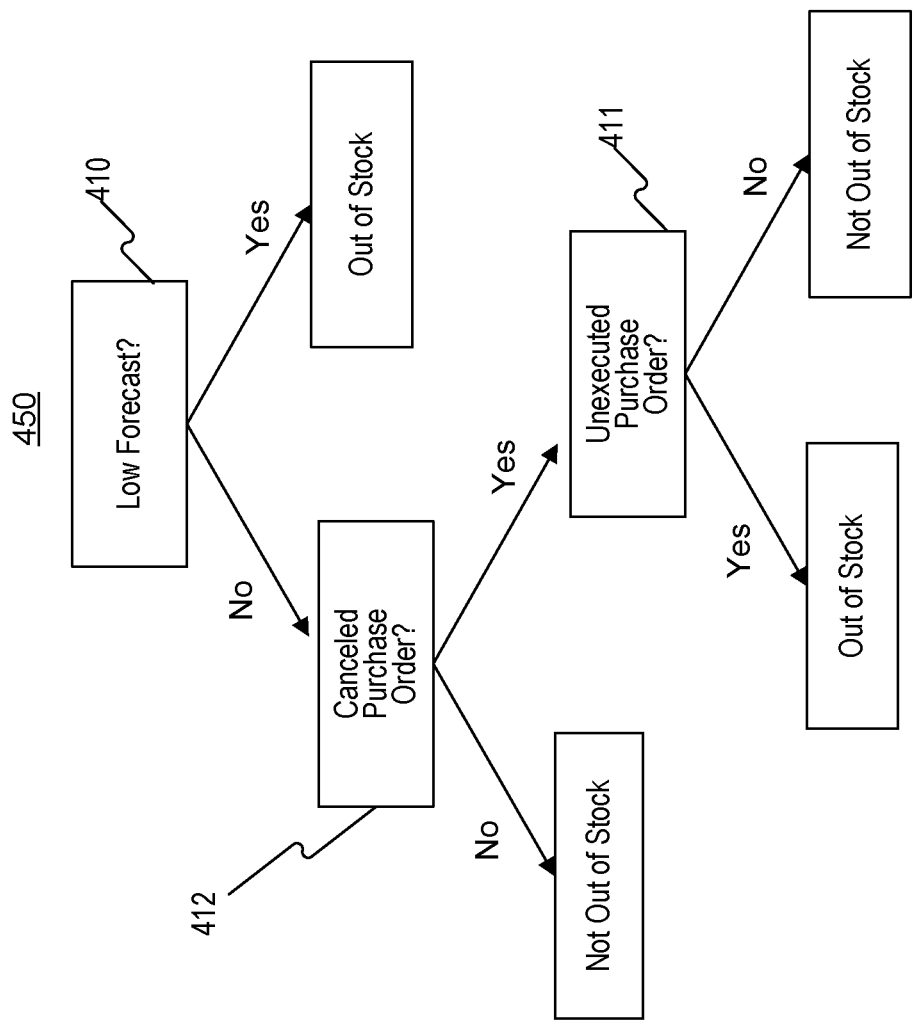
FIG. 4D shows an exemplary decision tree comprising a plurality of conditions.

After step 315 in FIG. 3B, the process moves to step 303 in FIG. 3A. In step 303, SCM 117 may predict an out of stock condition of the item based on the determined cause.

In step 304, SCM 117 may contact a supplier of the out of stock item to request more items based on the prediction. For example, if an item was predicted to be out of stock, SCM 117 may contact a supplier of the out of stock item to request more items. SCM 117 may also check status of purchase orders to prevent unexecuting the purchase orders if the determined cause is unexecuted purchase orders of the item.

Figure 5A:
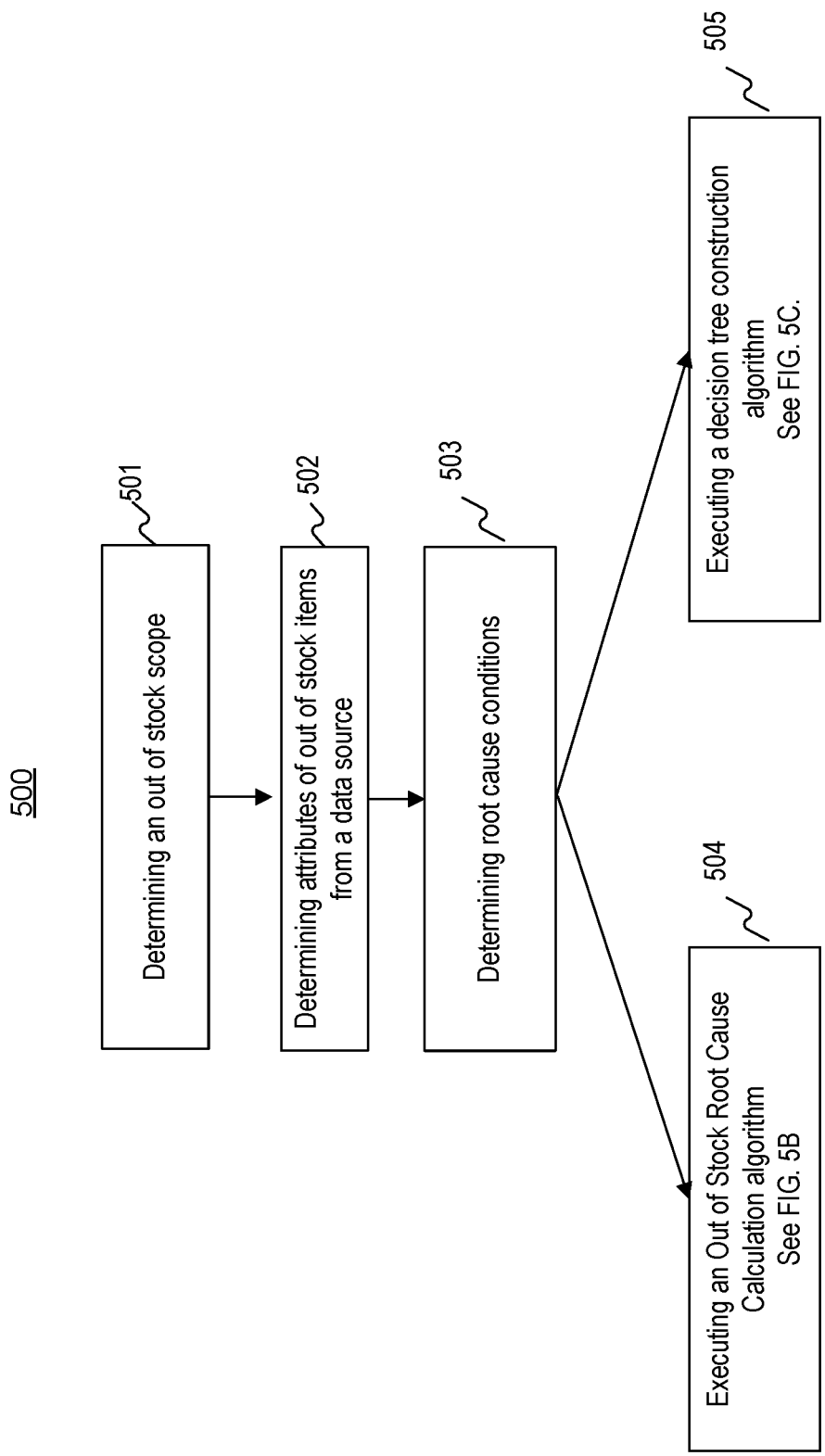
FIG. 5A shows an exemplary method for analyzing a reason for out of stock by running an out of stock root cause calculation algorithm or a decision tree construction algorithm on Supply Chain Management system, consistent with the disclosed embodiments.

FIG. 5A shows an exemplary method 500 for analyzing a reason for out of stock by running an out of stock root cause calculation algorithm or a decision tree construction algorithm on SCM system 117. The method or a portion thereof may be performed by SCM system 117. For example, the system may include one or more processors and a memory storing instructions that, when executed by the one or more processors, cause the system to perform the steps shown in FIG. 5A.

In step 501, SCM 117 may determine an out of stock scope. SCM 117 may receive information associated with an out of stock item from FO system 113. As described above with respect to FIG. 1A, FO system 113 may store information related to items stored in fulfillment center 200. The stored information may provide a list of items (SKUs) that are out of stock when the quantity of the items stored in fulfillment center reaches zero (Out of Stock).

In step 502, SCM 117 may determine attributes associated with out of stock items determined in step 501 from a data source. The data source may provide SKU-level data from purchase orders, receiving and stowing time, master data, sales, order cycles, etc. The data source may refer to FO system 113 which stores information associated with items stored in fulfilment centers.

In step 503, SCM 117 may determine root cause conditions for each determined out of stock item from step 501. For example, SCM 117 may determine a first determined item went out of stock from a mistake from commercial decisions such as obsolete confirming and strategic decision; a second determined item went out of stock from the supplier's defect such as none delivery and short delivery; a third determined item went out of stock from a defect in ordering items such as low recommended order quantity and sales spike; and a fourth determined item wen out of stock from a fulfillment center's defect such as a delay in receiving items and a delay in stowing items. SCM 117 may decide which category an out of stock item can be assigned based on determined attributes from step 502.

Figure 5B:
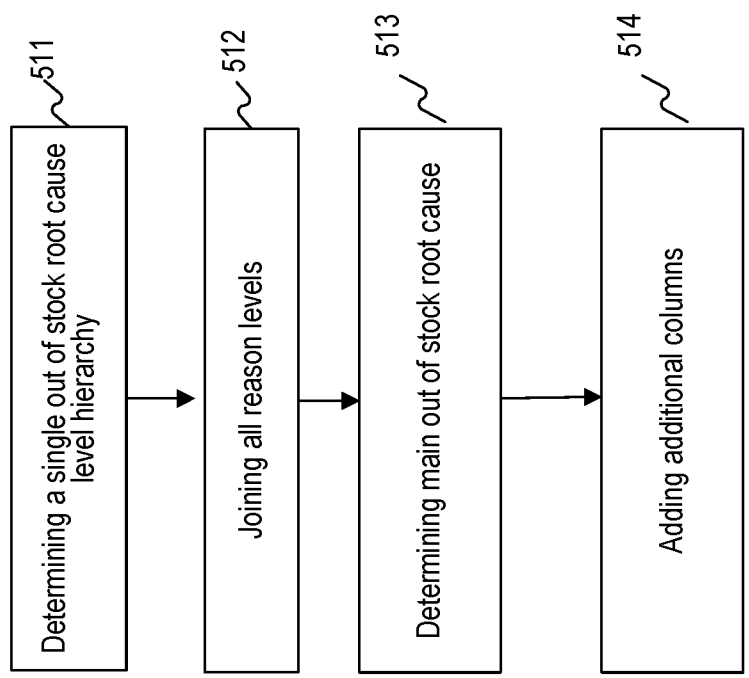
FIG. 5B shows an exemplary method for analyzing a reason for out of stock by running an out of stock root cause calculation algorithm, consistent with the disclosed embodiments.

In step 504, SCM 117 may execute an out of stock root cause calculation algorithm to analyze the reason for out of stock. Step 504 is further described with respect to step 511 in FIG. 5B.

Figure 6A:
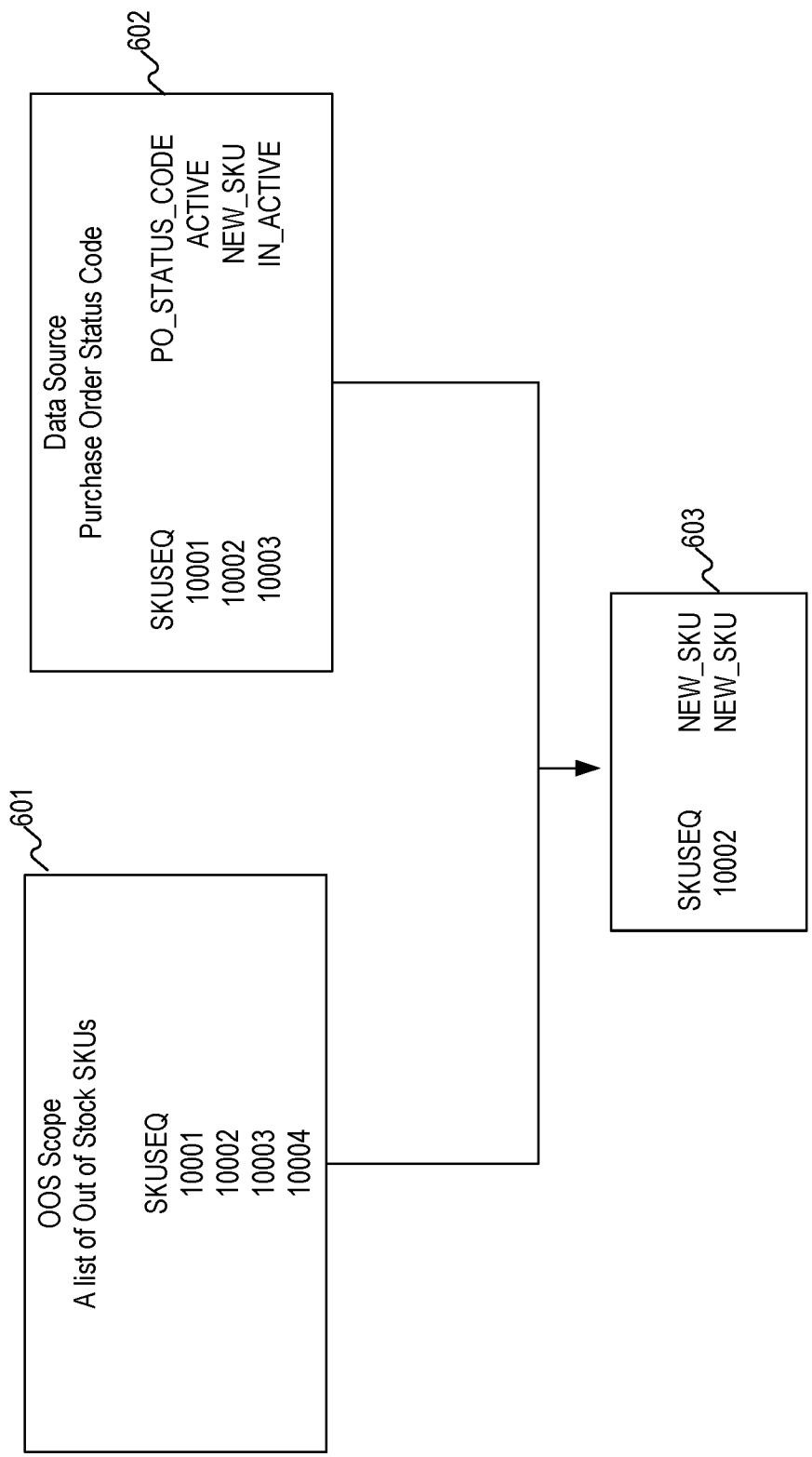

In step 511 (FIG. 5B), SCM 117 may determine a single out of stock root cause level hierarchy. The single out of stock root cause is determined by locating a determined out of stock item (from step 501), in the determined data source from step 502. For example, as shown in FIG. 6A, list 601 provides a list of out of stock items determined in step 501 and data source 602 provides attributes associated with items such as a purchase order status code. As shown in box 603, SCM 117 may determine a single out of stock root cause level hierarchy by locating item 10002 (depicted as SKUSEQ 10002 in FIG. 6A) in data source 602 and assigning corresponding PO_STATUS_CODE (new_sku) as the single out of stock root cause. In another example, SCM 117 may assign level1_level11, level1_level12, or level2_level21 as a single out of stock root cause. Moreover, it is appreciated that SCM 117 may assign different single out of stock root cause based on the determined data source associated with the determined out of stock item.

Figure 6B:
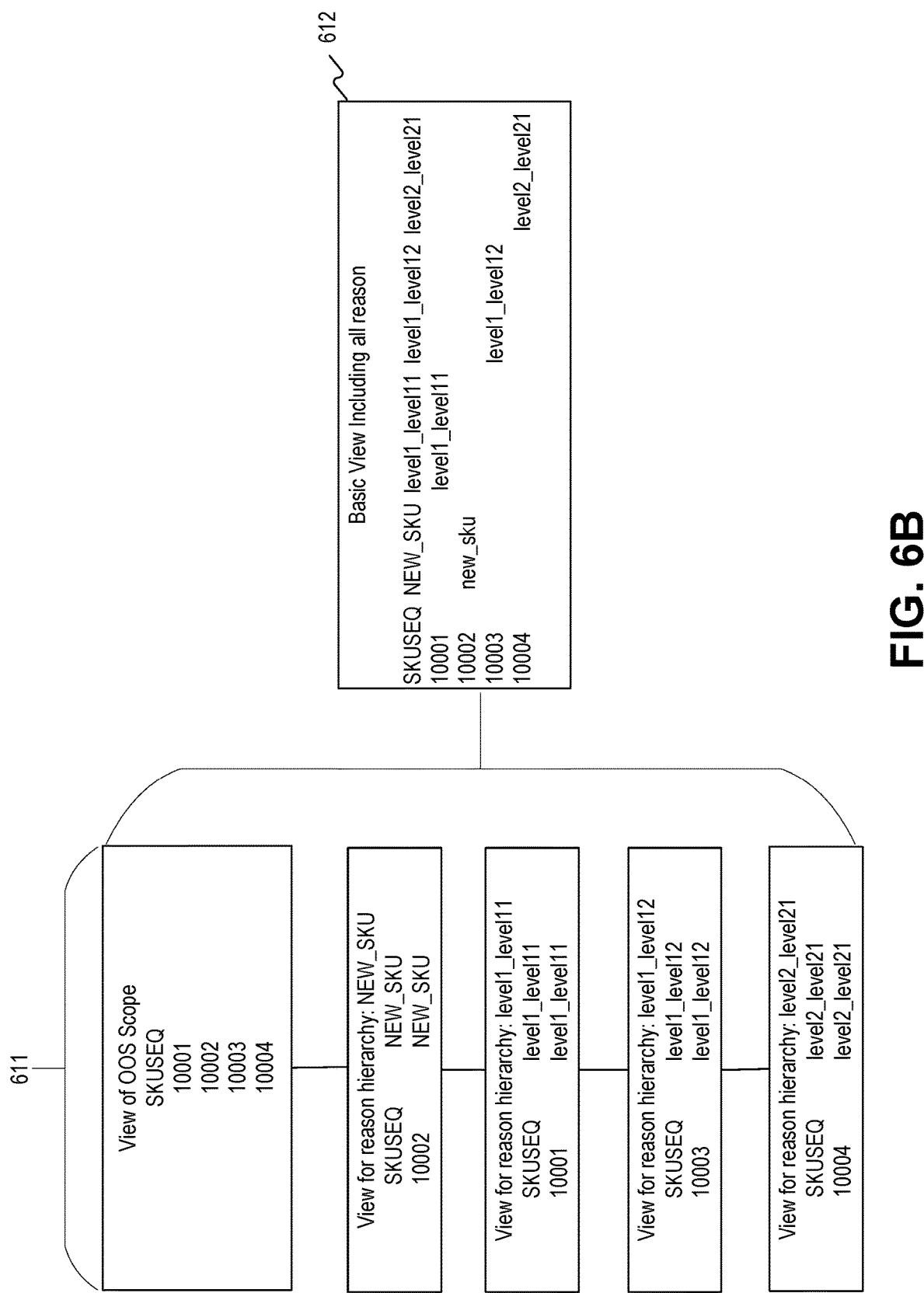

In step 512, SCM 117 may join all reason levels of out of stock root causes for each out of stock item. Each of the reason levels is determined in step 511. For example, as shown in FIG. 6B, determined out of stock root causes for each determined out of stock item (depicted in 611) is joined as depicted in 612. By way of further example, out of stock reason levels level 1 and level 11 for item 10001 are joined to provide reasons for the out of stock condition of item 10001. The joined reason levels are arranged in table in respect to its priority. For example, as shown in exemplary table 612, reason levels are arranged in respect to its priorities, wherein "NEW_SKU" is associated with the highest priority and "level2_level21" is associated with the least priority.

In step 513, SCM 117 may determine a main out of stock root cause and an out of stock reason for each level. As shown in hierarchy node 621 in FIG. 6C, SCM 117 may assign a first not null reason in hierarchy node as the main reason for out of stock for each item. As depicted in hierarchy node 621 in FIG. 6C, level1_level11 is assigned as the main reason for out of stock for item 10001. Table 622 provides determined main out of stock causes for out of stock items. SCM 117 may further resolve out of stock reasons based on the main reason. For example, as shown in table 623 in FIG. 6C, SCM 117 may determine that a first level of reason for out of stock is level 1 and a second level of reason for out of stock is level 11 for item 10001 based on its main reason level1_level11. By way of further example, level 1 may refer to a defect from suppliers and level 11 may refer to a non-delivery from the suppliers. Moreover, it is appreciated that reasons may comprise conditions suitable to cause out of stock conditions.

Figure 6C:
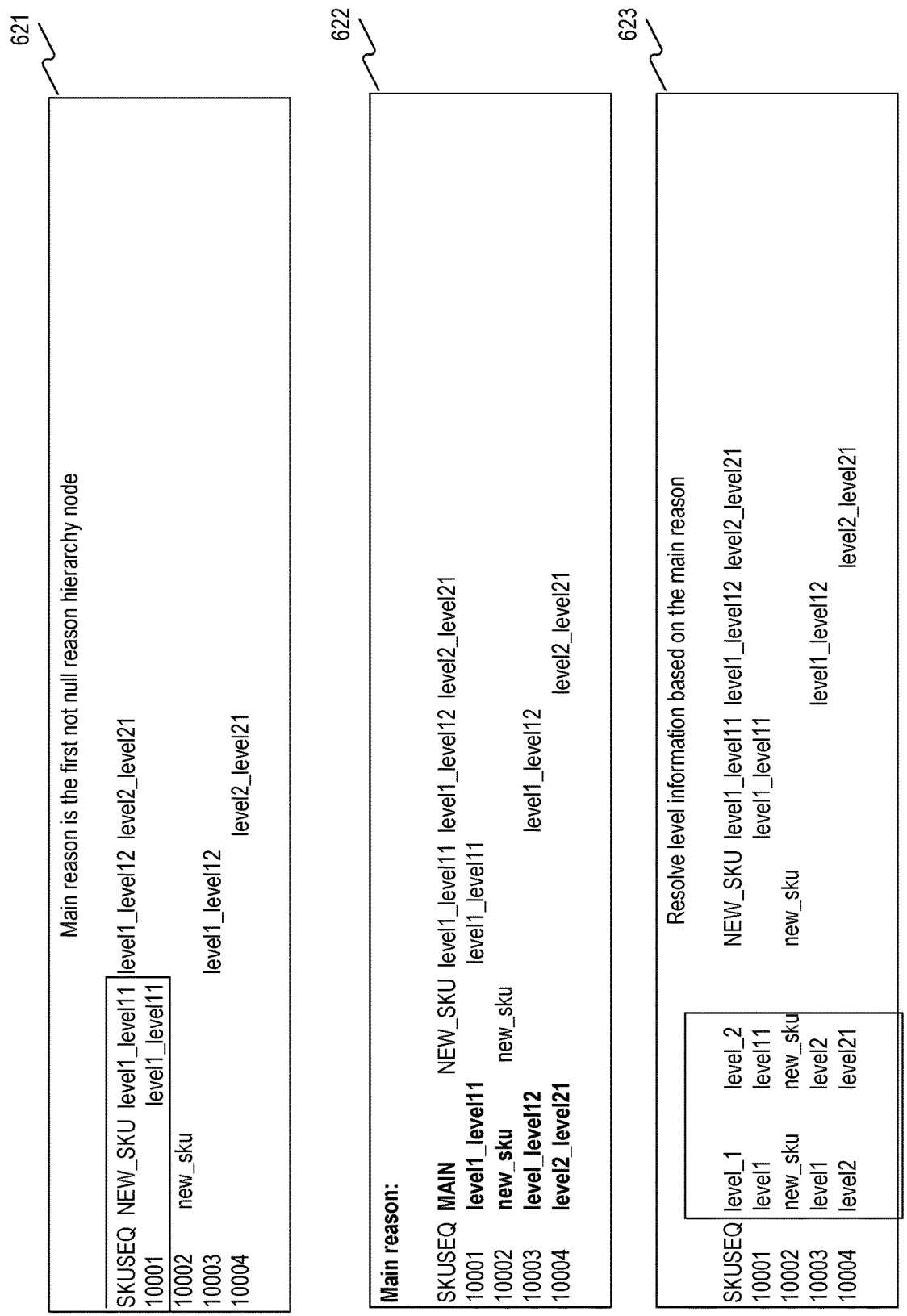

In step 514, SCM 117 may add additional columns representing another root cause for each out of stock item. For example, SCM 117 may add information such as SKU description, SKU Bands, etc. As shown in FIG. 6C, SCM 117 may add SKU names 623 for each out of stock item as additional information.

Figure 5C:
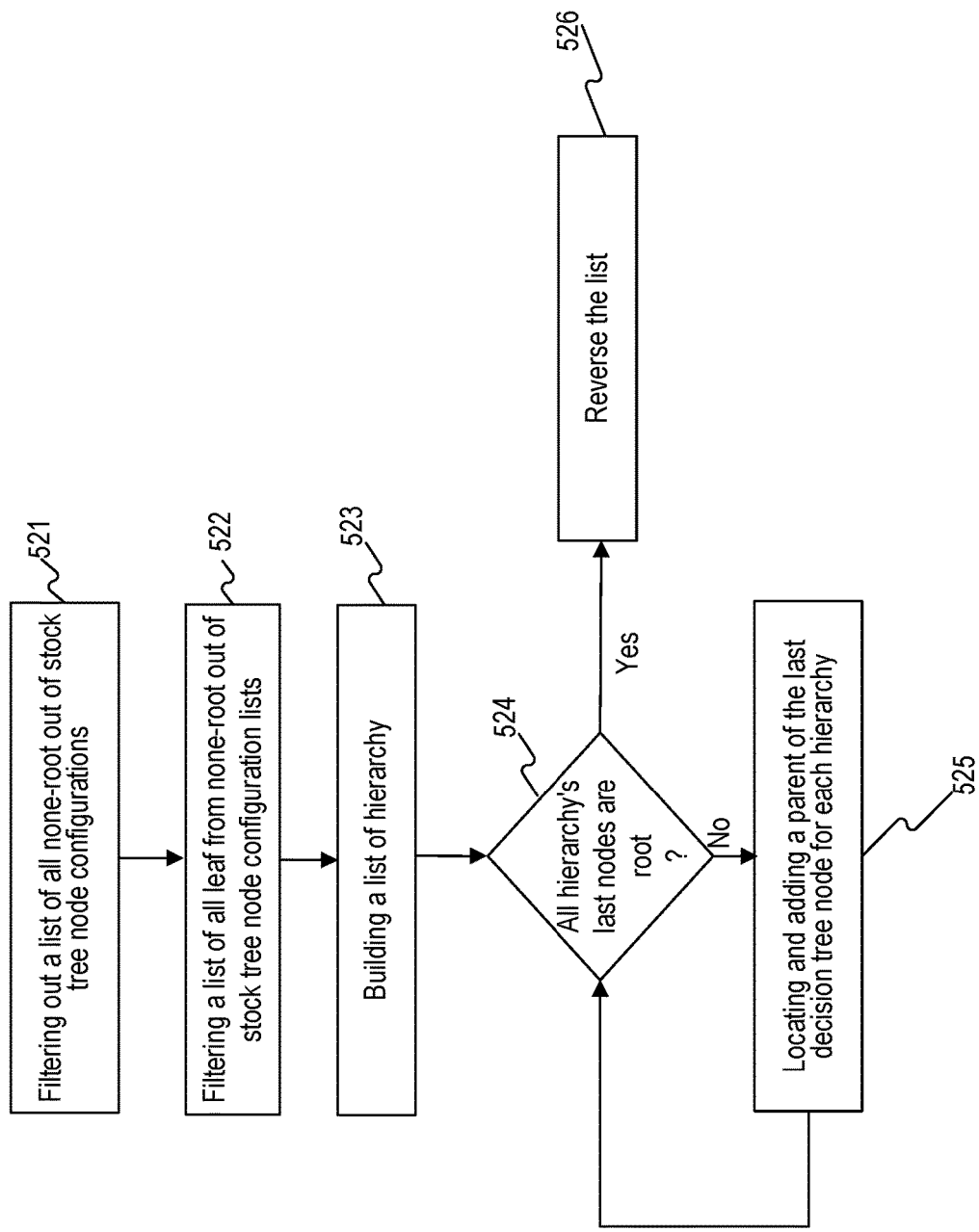
FIG. 5C shows an exemplary method for analyzing a reason for out of stock by running a decision tree construction algorithm on Supply Chain Management system, consistent with the disclosed embodiments.

In another embodiment, SCM 117 may, in step 505 (of FIG. 5A), execute a decision tree construction algorithm to analyze the reason for out of stock. Step 505 is further described with respect to step 521 in FIG. 5C. In step 521, SCM 117 may filter out a list of all none-root out of stock conditions. The determined attributes from step 502 may comprise information describing whether a condition is a root or none-root. For example, if a determined root condition from step 503 comprises information that the determined root condition is root, then the root condition is root while other root conditions are none-root conditions.

In step 522, SCM 117 may filter a list of all leaf from the filtered list of none-root out of stock conditions. The determined attributes from step 502 may comprise information describing whether a condition is parent of other conditions. For example, if a determined root condition from step 503 comprises information that the determined root condition is not parent of other conditions, then the root condition is a leaf.

In step 523, SCM 117 may build a list of hierarchy. SCM 117 may determine a parent condition of each leaf condition filtered in step 522. The parent condition is included in the determined attributes from step 502 for each leaf condition. When the parent condition is determined, SCM 117 may add the determined parent condition to corresponding leaf condition as the new leaf condition.

In step 524, SCM 117 may determine whether all hierarchy's last nodes are root. If all hierarchy's last nodes are not root, SCM 117 may, in step 525, locate and add a parent of the last decision tree node for each hierarchy. If all hierarchy's last nodes are root, SCM 117 may, in step 526 reverse the hierarchy list.

FIG. 7 shows an exemplary decision tree hierarchy list. The exemplary decision tree hierarchy list depicts three tree hierarchies: a first tree hierarchy 701, a second tree hierarchy, and a third tree hierarchy. First tree hierarchy 701 includes Global Sourcing leaves (including leaf 702). Second tree hierarchy includes an FC Defect leaf and a Stow Delay leaf. Third tree hierarchy may include a Supplier Defect leaf 703, a None Delivery leaf 704, and a Zero Confirmed leaf 705.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A supply chain management system, comprising:
one or more memory devices storing instructions;
one or more processors configured to execute the instructions to perform operations comprising:
receiving information associated with an out of stock item from a fulfillment optimization system storing information associated with items in a fulfillment center, the information collected over an extended period, and a limited number of conditions;
determining a cause of the out of stock condition by running a decision tree against the received information, the decision tree includes the limited number of conditions, wherein determining a cause of the out of stock condition by running a decision tree comprises:
measuring a purity for each condition of the limited number of conditions, wherein the purity provides a certainty about whether an item is out of stock or not after a condition of the limited number of conditions splits the decision tree;
choosing a condition of the limited number of conditions with the highest purity that splits the decision tree into branches;
storing the chosen condition in a data structure;
repeating measuring a purity for each of remaining condition of the limited number of conditions and choosing a different condition of the remaining conditions with the highest purity to form a subdivided branch based on the chosen condition until all conditions of the limited number of conditions split the decision tree into branches; and
determining the cause of the out of stock condition by finding a condition forming the longest path from a root to a leaf of the decision tree;
predicting the out of stock condition of the item based on the determined cause;
contacting a supplier of the out of stock item to request one or more items of the out of stock item based on the prediction; and
ordering the one or more items of the out of stock item from the supplier for the fulfillment center.

2. The supply chain management system of claim 1, wherein the purity is symmetric.

3. The supply chain management system of claim 1, wherein the extended period covers 7 days.

4. The supply chain management system of claim 1, wherein the information associated with the out of stock item includes at least one cause for the out of stock condition on a day.

5. The supply chain management system of claim 1, wherein the limited number of conditions includes a low forecast for purchasing the out of stock item, an unexecuted purchase order, an unreceived purchase order by a supplier, a failure from a supplier to deliver an ordered amount of the out of stock item, a defect with the out of stock item, and a canceled purchase order.

6. The supply chain management system of claim 1, wherein the operations further comprise contacting a supplier to check on status of purchase orders associated with the out of stock item.

7. A supply chain management method, comprising:
receiving information associated with an out of stock item from a system storing information associated with items in a fulfillment center, the information collected over an extended period, and a limited number of conditions;

determining a cause of the out of stock condition by running a decision tree against the received information, the decision tree includes the limited number of conditions, wherein determining a cause of the out of stock condition by running a decision tree comprises:

measuring a purity for each condition of the limited number of conditions, wherein the purity provides a certainty about whether an item is out of stock or not after a condition of the limited number of conditions splits the decision tree;

choosing a condition of the limited number of conditions with the highest purity that splits the decision tree into branches;

storing the chosen condition in a data structure;

repeating measuring a purity for each of remaining condition of the limited number of conditions and choosing a different condition of the remaining conditions with the highest purity to form a sub-divided branch based on the chosen condition until all conditions of the limited number of conditions split the decision tree into branches; and determining the cause of the out of stock condition by finding a condition forming the longest path from a root to a leaf of the decision tree;

predicting the out of stock condition of the item based on the determined cause;

contacting a supplier of the out of stock item to request one or more items of the out of stock item based on the prediction; and ordering the one or more items of the out of stock item from the supplier for the fulfillment center.

8. The supply chain management method of claim 7, wherein the purity is symmetric.

9. The supply chain management method of claim 7, wherein the extended period covers 7 days.

10. The supply chain management method of claim 7, wherein the information associated with the out of stock item includes at least one cause for the out of stock condition on a day.

11. The supply chain management method of claim 7, wherein the limited number of conditions includes a low forecast for purchasing the out of stock item, an unexecuted purchase order, an unreceived purchase order by a supplier, a failure from a supplier to deliver an ordered amount of the out of stock item, a defect with the out of stock item, and a canceled purchase order.

12. The supply chain management method of claim 7, wherein the operations further comprise contacting a supplier to check on status of purchase orders associated with the out of stock item.

* * * * *